United States Patent [19]

Packer

[11] Patent Number: 4,528,711
[45] Date of Patent: Jul. 16, 1985

[54] PORTABLE WHEEL CHAIR RAMP

[76] Inventor: Louis Packer, 632 St. Louis Ave., Youngstown, Ohio 44511

[21] Appl. No.: 515,996

[22] Filed: Jul. 22, 1983

[51] Int. Cl.³ .................................... E01D 15/12
[52] U.S. Cl. .......................... 14/69.5; 238/10 R
[58] Field of Search ............... 14/69.5, 71.1, 72.5; 182/223; 238/10 R; 414/537; 193/38, 41

[56] References Cited

U.S. PATENT DOCUMENTS

| | | | |
|---|---|---|---|
| 854,329 | 5/1907 | Charron | 14/69.5 X |
| 981,613 | 1/1911 | Carter | 14/69.5 X |
| 1,194,819 | 8/1916 | Clark | 193/38 |
| 1,224,045 | 4/1917 | Titsworth | 193/41 X |
| 1,455,293 | 5/1923 | Kolling et al. | 238/10 R |
| 3,009,183 | 11/1961 | Lay | 14/69.5 |
| 3,818,528 | 6/1974 | Peterson | 14/69.5 |
| 3,936,898 | 2/1976 | Poe | 14/69.5 |
| 4,042,992 | 8/1977 | Hyslop | 14/69.5 |
| 4,084,713 | 4/1978 | Rohrs et al. | 14/69.5 X |

FOREIGN PATENT DOCUMENTS

| | | | |
|---|---|---|---|
| 369132 | 3/1932 | United Kingdom | 238/10 R |
| 370353 | 4/1932 | United Kingdom | 414/537 |
| 1038445 | 8/1966 | United Kingdom | 14/69.5 |

Primary Examiner—James A. Leppink
Assistant Examiner—Beverly E. Hjorth
Attorney, Agent, or Firm—Harpman & Harpman

[57] ABSTRACT

A lightweight portable wheel chair ramp comprising a pair of ramps detachably secured to one another in a compact, portable configuration. Each ramp is telescopically extensible with oppositely disposed non-slip surface engaging flanges and can be adjustably locked to the length required. A pair of alignment and spacer brackets secure the ramps together in spaced parallel relation during operation. The ramps can be detached from one another, collapsed and secured together for ease of transport.

3 Claims, 7 Drawing Figures

U.S. Patent     Jul. 16, 1985     4,528,711
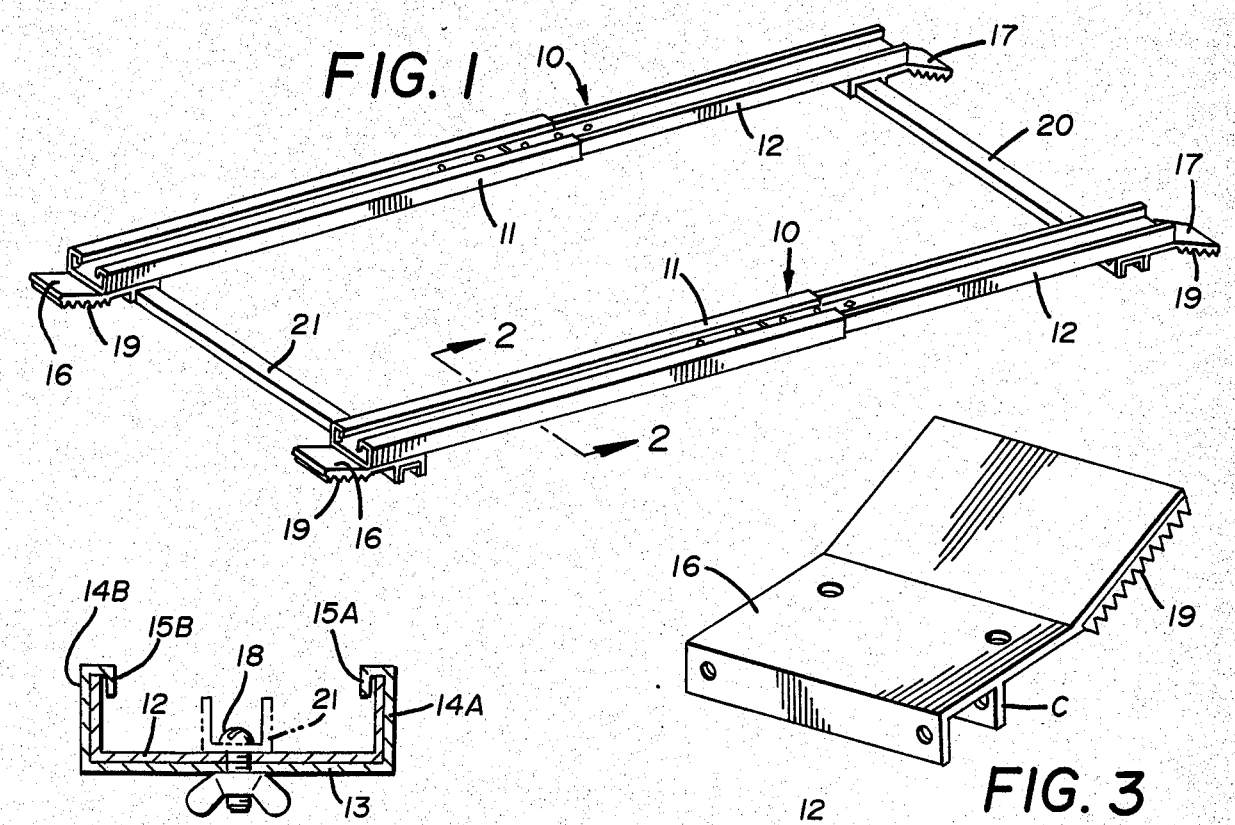
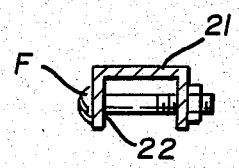
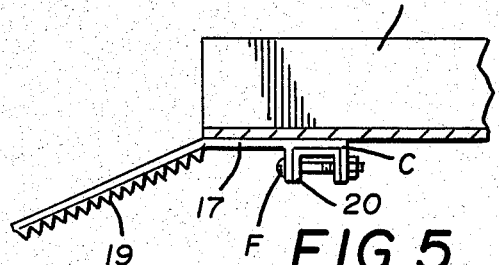
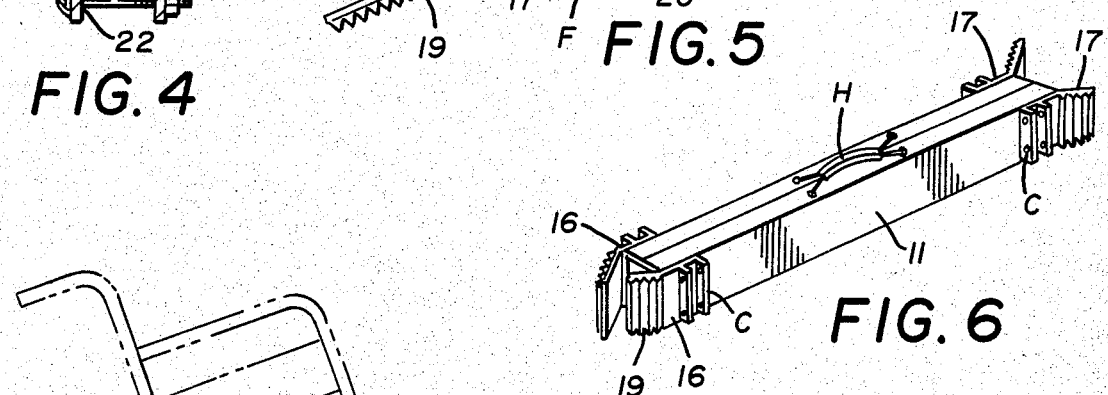
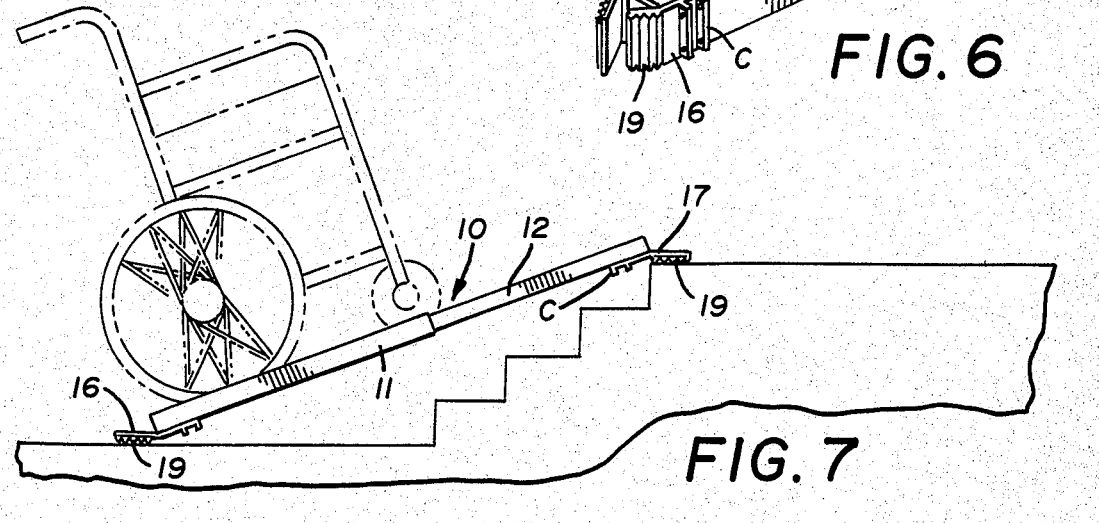

PORTABLE WHEEL CHAIR RAMP

BACKGROUND OF THE INVENTION

1. Field of the Invention

This invention relates to wheel chair ramps and the like used to provide a transfer structure for wheel chairs between two areas of an unequal height, such as a stairs.

2. Description of the Prior Art

Prior art devices of this type have relied on a number of different designs. See for example U.S. Pat. Nos. 4,084,713, 3,818,528 and 3,009,183.

In U.S. Pat. No. 4,084,713, a vehicle wheel chair ramp is disclosed having a multiple hinge configuration extending from a vehicle to the ground. A series of internal steps are provided within the ramp.

U.S. Pat. No. 3,818,528 shows a portable ramp for wheel chairs having multiple ramp sections hinged to one another in an end to end configuration with foldable ramp legs of different heights secured under the ramp section.

In U.S. Pat. No. 3,009,183, a variable length portable ramp is disclosed having interlocking convex and concave surfaces integrally formed between the longitudinal tracks. Applicant's device discloses a pair of separate telescopically extensible ramps, each of which has ground engaging oppositely disposed flanges. The ramps are detachably secured in spaced parallel relation to one another with each ramp being lockable in extended position for use and collapsible for transport.

SUMMARY OF THE INVENTION

A lightweight portable wheel chair ramp having a pair of telescopically extensible ramp members secured to one another for transportation and storage being separated in spaced parallel position to one another during use. In normal use the ramp members are spaced in fixed relation to one another by spacer brackets and the ramps are extended to the length required and locked in place. Oppositely disposed ground engaging flanges on each end of each ramp holds the ramps in proper position.

DESCRIPTION OF THE DRAWINGS

FIG. 1 is a perspective view of the wheel chair ramp;

FIG. 2 is an enlarged partial section on lines 2—2 of FIG. 1;

FIG. 3 is an enlarged view of an end portion of the ramp;

FIG. 4 is a enlarged cross sectional view of a portion of the wheel chair ramp;

FIG. 5 is an enlarged portion of the wheel chair ramp;

FIG. 6 is a perspective view of the wheel chair ramp in closed transportable position; and FIG. 7 is a side elevation of the wheel chair ramp in use.

DESCRIPTION OF THE PREFERRED EMBODIMENT

A wheel chair ramp can be seen in FIGS. 1 and 2 of the drawings comprising a pair of ramps 10, each of which has an outer support member 11 and an inner support member 12, the outer support member 11 has an elongated rectangular base 13, oppositely disposed upstanding side walls 14A and 14B extending from said rectangular base 13 and inturned and downturned flanges 15A and 15B extending from the free edges of said side walls in parallel relation to said base 13 and said side walls.

Ground engaging flanges 16 are secured to one end of each of said bases 13 extending outwardly therefrom and angularly disposed in relation to the longitudinal axis of said bases. The elongated inner support member 12 is of a cross sectionally U-shape and is of an outer width smaller than that of the inner width of the outer support member 11 so as to slidably fit therein. See FIGS. 1,2 and 7 of the drawings.

Secondary ground engaging flanges 17 are secured on one of the ends of each of said inner support members 12 opposite the ground engaging flanges 16 and are angularly disposed in relation to the longitudinal axis of said inner support members 12 opposite that of the angular disposition of the ground engaging flanges 16. Each of the outer and inner support members 11 and 12 have a plurality of longitudinally spaced apertures adjacent their respective ends for registry with one another. Removable fasteners 18 secure the inner and outer support members in extended position by passing through the aligned apertures as best seen in FIG. 2 of the drawings.

Referring now to FIGS. 1,3 and 4 of the drawings, the ground engaging flanges 16 and 17 can be seen having a non-slip textured surface 19 preferably of a rubber-like material secured to the underside thereof. These non-slip surfaces 19 contact the ground and prevent the extended ramps 10 from sliding during use.

A pair of spacer brackets 20 and 21 as seen in FIGS. 1,4 and 5 of the drawings, are comprised of an inverted U-shaped channel member with transversely positioned openings 22 formed inwardly from each end. The bracket 20 is engaged in a downturned channel C extending from said flanges 17, said channels having apertures that register with said openings 22. The other bracket 21 is engaged in a downturned channel C that extends from the flanges 16 secured to the outer support members 11. Fasteners F secure said brackets 20 and 21 with said channels C.

Each of the downturned channels C is of a width greater than that of said bracket so that the same can slidably fit within. Each of the spacer brackets 20 and 21 shown in broken lines in FIG. 2 of the drawings are apertured to receive the fasteners 18 so they can be secured to the inner support members 12 for storage and during transportation when the inner and outer support members are joined together as seen in FIG. 6 of the drawings.

The ramps 10 are secured to one another by suitable fasteners means such as a latch, as will be well understood in the art, forming a compact lightweight portable package with a handle H that can be easily transported by one individual to the site required and easily set up as seen in FIG. 6 of the drawings.

In use, the ramps are separated and fasteners 18 are temporarily removed freeing the spacer brackets 20 and 21. The inner support members 12 are slid outwardly the required length aligning the apertures within the inner and outer support member units. The fasteners 18 are then replaced through the apertures securing the support members in extended position. The spacer brackets 20 and 21 are positioned between the ramps 10 adjacent their respective ends within the downturned channels C in the flanges 16 and 17 respectively.

The ground engaging flanges 16 and 17 each support the ramps 10 and prevent the ramps from slipping. The side walls 14A and 14B and the U-shaped inner support members prevent a wheel chair from veering off the ramps during use, while the spacer brackets 20 and 21 maintain the proper spaced parallel relationship of the ramps which is equal to that of the wheel chair.

It will thus be seen that a new and useful compact portable wheel chair ramp has been illustrated and described and that various changes and modifications may be made herein without departing from the spirit of the invention and having thus described my invention what I claim is:

1. A portable self-contained wheel chair ramp comprising a pair of ramps, each of said ramps having first and second elongated telescopically engaged support members that are cross sectionally U-shaped, inturned and downturned continuously extending flanges on each of said first support members arranged to overlie portions of each of said second support members, longitudinally extending angularly disposed support flanges on the ends of each of said ramps, a pair of transversely positioned elongated spacer brackets, the ends of which are respectively attached to said support flanges whereby said pairs of ramps are uniformly transversely spaced with respect to one another.

2. The portable self-contained wheel chair ramp of claim 1 wherein said angularly disposed support flanges each having downwardly extending, transversely extending, apertured channels registrable with said spacer brackets for positioning the same at right angles to said support flanges.

3. The portable self-contained wheel chair ramp of claim 1 wherein said inturned and downturned flanges are inverted U-shaped so as to cage the upper longitudinal edges of said second elongated telescopically engaged support member.

* * * * *